Dec. 28, 1948.   J. K. NORTHROP ET AL   2,457,316
PROSTHETIC WRIST
Filed Nov. 18, 1946   2 Sheets-Sheet 2
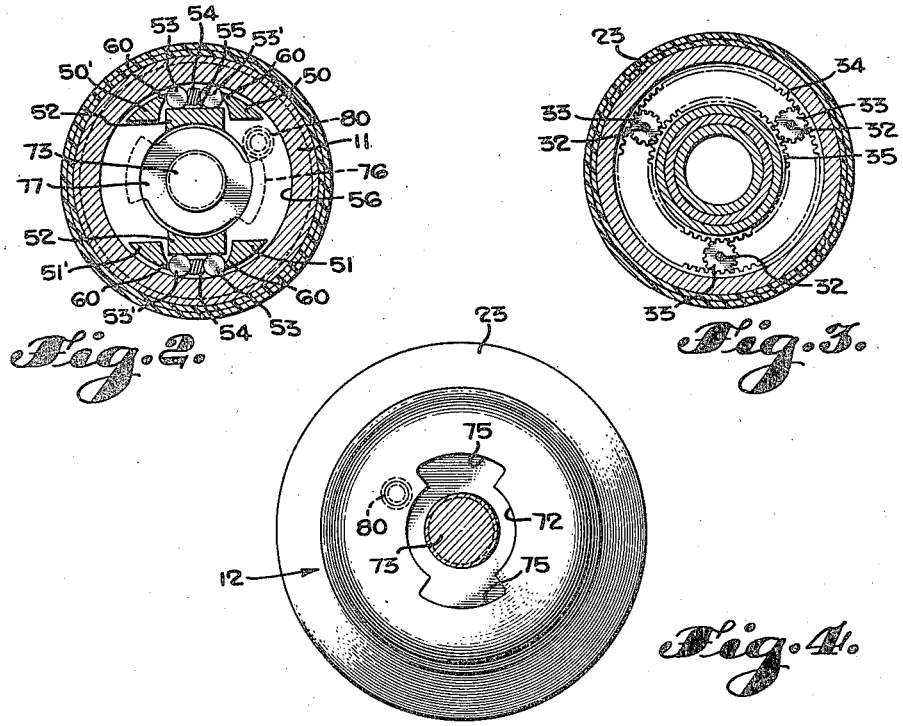
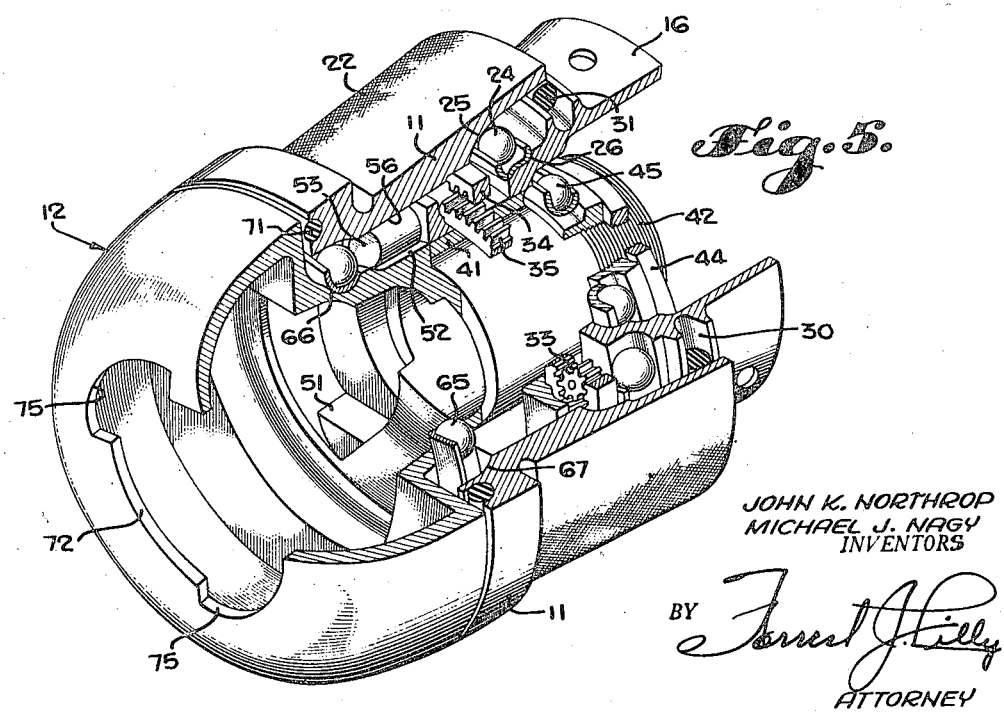
JOHN K. NORTHROP
MICHAEL J. NAGY
INVENTORS
BY Forrest J. Lilly
ATTORNEY Patented Dec. 28, 1948

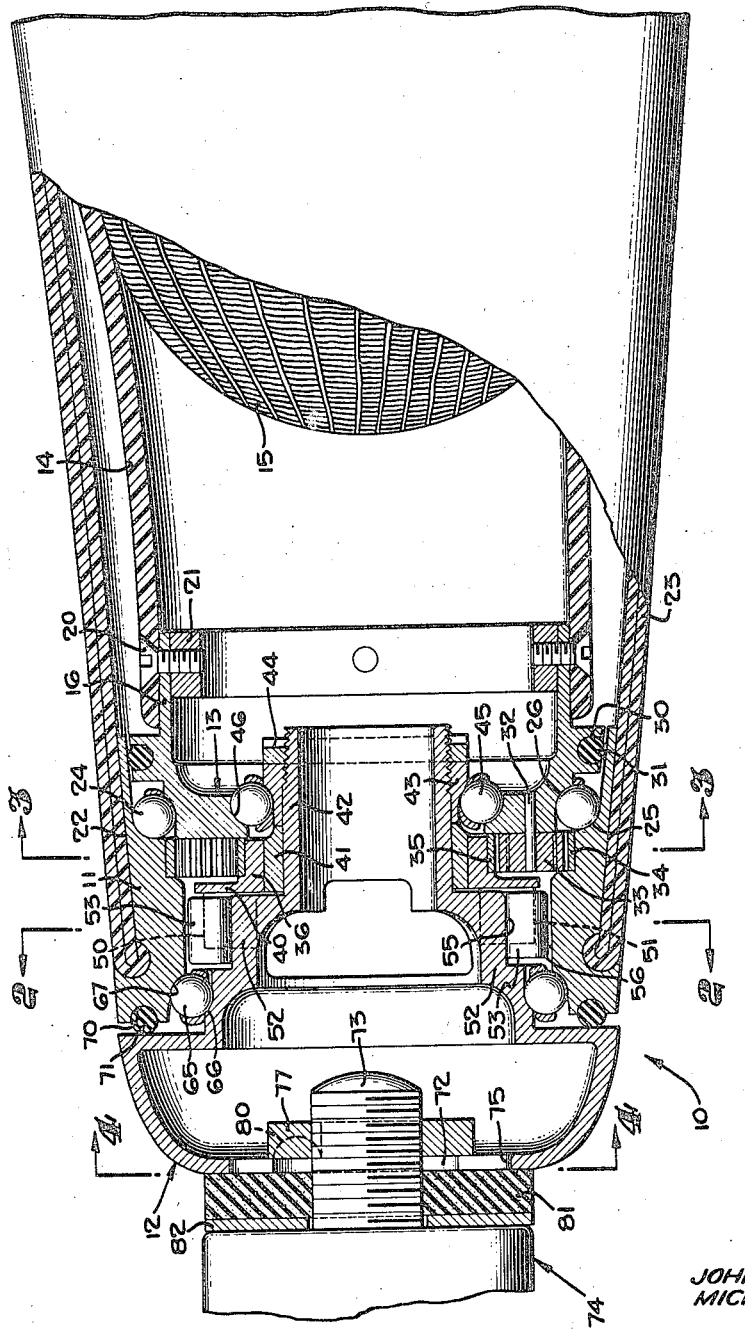

2,457,316

UNITED STATES PATENT OFFICE 2,457,316

PROSTHETIC WRIST

John K. Northrop, Los Angeles, and Michael J. Nagy, Inglewood, Calif., assignor to Northrop Aircraft, Inc., Hawthorne, Calif., a corporation of California Application November 18, 1946, Serial No. 710,500

10 Claims. (Cl. 3—12)

1

The present invention relates to prosthetic devices, and more particularly to a wrist mechanism for use in partial amputations of the forearm.

The primary object of the present invention is the provision of a wrist mechanism embodying improved means for rotating the hand or hook by rotation of the stump within an outer forearm shell. In most cases where a partial amputation has left an appreciable length of forearm stump, there is a limited amount of rotation of the stump which can be utilized to effect rotation of the prosthetic wrist. The amount of rotation available, however, is somewhat less than in direct proportion to the length of the stump, hence prior efforts to connect the prosthetic hand directly to the stump to utilize the rotative function of the latter have not been satisfactory due to the fact that the rotation so obtained is entirely inadequate.

Another important object of the present invention, therefore, lies in the provision of means for multiplying the rotative motion of the stump so that the rotation of the prosthetic hand closely approximates that of the natural hand.

A further object of the invention is to provide a prosthetic wrist embodying a locking device operative to lock the wrist against turning in either direction from external forces applied to its forward end by the hook or hand, whereby the stump is relieved of torsional loads of high magnitude or of shock intensity which might be transmitted back from the hand as a result of a sudden shift in the load carried thereby.

These and other objects and advantages of the present invention will become apparent upon consideration of the following detailed description of the preferred embodiment thereof, reference being had to the accompanying drawings, wherein:

Figure 1 is a longitudinal section taken substantially along the vertical median plane through a prosthetic wrist, parts of the locking mechanism being omitted to show other parts in elevation for purposes of illustration.

Figure 2 is a sectional view taken along the line 2—2 in Figure 1;

Figure 3 is a sectional view taken along the line 3—3 in Figure 1;

Figure 4 is a view taken along the line 4—4 in Figure 1; and

Figure 5 is a partially sectioned perspective view of the wrist.

In the drawings, the wrist is designated in its entirety by the reference numeral 10 and comprises generally a housing 11, cap 12, and a pinion carrier 13 which is attached to an inner plastic

2 forearm shell 14 and serves as the driver for the rotational mechanism. The forearm shell 14 is preferably fabricated of knit cotton tubing, known as "stockinet," which is stretched over a plaster form, then impregnated with a liquid plastic and cured in an oven. Inside the shell 14 and attached to it as an integral part thereof is a stump socket 15 which is also formed of plastic impregnated stockinet molded over a plaster model of the stump. The lower end of the forearm shell 14 is trimmed square with the axis of the wrist and receives an annular flange 16 projecting from the back end of the pinion carrier 13. Attachment of the shell 14 to the flange 16 is by four countersunk screws 20 which project through aligned holes in the shell 14 and flange 16 and are threaded into an adapter ring 21 inside the flange. The adapter ring may, if desired, be formed as an integral part of the flange 16.

The outer peripheral surface of the housing 11 is formed with a slight conical taper and is knurled at 22 to provide a roughened surface for improved mechanical bond to the housing 11, which may be and preferably is formed of knit cotton tubing, such as "stockinet" in the same manner as forearm shell 14. Extending down over and bonded to this knurled surface is the forward end of an outer forearm shell 23 having the general proportions and shape of a natural forearm. The forearm shell 23 is likewise formed of plastic impregnated stockinet molded over a plaster model and cured in an oven, and is connected at its upper end by a hinge (not shown) to a corset assembly strapped to the upper arm of the amputee, said hinge being coaxial with the pivot axis of the elbow joint.

The pinion carrier 13 extends into the housing 11 from the back end thereof and is journaled for rotation in a ball bearing assembly 24, the balls of which run on races 25 and 26 formed on the housing 11 and carrier 13, respectively. Adjacent the ball bearing assembly 24 is a raised annular channel 30 containing an O-ring seal 31 of felt or the like which closes the clearance between the member 13 and housing 11 to exclude dirt and moisture from the interior.

Projecting forwardly from the outer end of the member 13 and parallel to axis of rotation thereof are three equidistantly spaced pinion stub shafts 32 upon which are journaled pinions 33. The pinions 33 mesh with a stationary outer ring gear 34 which is pressed into an internal annular flange in the interior of the housing 11, and with a central sun gear 35. The sun gear 35 is a spur gear which is pressed into place on an external annular flange 36 of a gear retainer and clutch release member 40. A bushing 41 is pressed into the interior of the flange 36, and runs on a hub 42 extending rearwardly from the cap member 12. The bushing 41 is confined on the hub 42 by a cone race 43 which is threaded onto the end of the hub and held by a lock nut 44. A ball bearing assembly 45 runs on the cone race 43 and on a cup race 46 formed in the member 13, providing a pilot bearing support for the inner end of the hub 42 within the pinion carrier 13. The bearing 45 applies an outwardly directed axial thrust force on the member 13 which, in turn, transmits the force to the housing 11 through the ball bearing 24. Thus, the member 13 is confined between members 11 and 12 and is freely rotatable with respect thereto, while loads applied to the cap member 12 through the hand or hook are transferred to the outer forearm shell 23 which is firmly connected to the upper arm of the amputee, through a hinge joint and corset assembly.

The member 40, as mentioned earlier, is both a gear retainer and clutch release, the latter function being served by two pairs of axially projecting release dogs 50, 50' and 51, 51'. Each pair of dogs is spaced apart circumferentially to receive between them a flat topped platform 52 formed integrally with the cap member 12, said platform supporting a pair of locking rollers 53 and 53' which are urged apart by a spring 54. The rollers 53, 53' are confined between the flat plane top 55 of the platform 52 and a cylindrical surface 56 on the inside of the housing 11, and any tendency for relative rotation between the parts 52 and 11 causes one or the other pair of rollers to be crowded or wedged tight between the converging surfaces 55, 56, thereby locking the parts against rotation.

The locking action of the rollers 53, 53' must first be released before the wrist can be turned by the stump, and to this end each of the release dogs 50, 50', 51, 51' is preferably undercut as shown, leaving an overhanging lip 60 which is engageable with its respective roller during the first few thousandths of an inch lost-motion travel of the dogs as the member 40 rotates relative to the cap 12, to push the roller out of its locking position immediately prior to engagement of the side of the platform 52 by the dog. With the dog thus abutting against the platform 52, the cap member 12 is thereafter pushed around on its axis by the member 40 at the same rotational speed as the sun gear 35. The clutch release dogs 50, 50', and 51, 51' may also be made with straight faces instead of undercut, in which case the platform 52 would be made slightly narrower so that the rollers 53, 53 project beyond the edge of the platform when in locking position and would therefore be engaged and unseated by the dogs before the latter engage the sides of the platforms. The pitch diameters of the planetary gears 33, 34, and 35 of the illustrative embodiment are .187, 1.50, and 1.125 respectively, which gives a step-up gear ratio of 2.3 to 1; hence, for each revolution of the stump socket 15, the cap 12 is rotated 2.3 turns.

The cap member 12 is journaled near its front end in a ball bearing assembly 65 running in races 66 and 67 formed in the cap member 12 and housing 11. A channel 70 is formed in the end of the housing 11 radially outward from the ball bearing 65, and disposed within this channel is an O-ring 71 which seals the interior against the entrance of dirt or moisture. The outer end of the cap member 12 is domed and, in the embodiment illustrated, is provided with a central aperture 72 which receives the threaded shank 73 of a prosthetic hand or hook, designated generally at 74. The aperture 72 in the outer end of the cap member 12 is provided with two diametrically opposed fan shaped notches 75 which are provided to admit correspondingly shaped lugs 76 formed on a nut member 77. The nut member 77 is screwed on to the threaded shank 73 and is adapted to be drawn up tight against the underside of the domed portion of the cap member to secure the hand 74 thereto. The nut 77 is held against turning by the rivet 80 which is driven into a hole in the end of the cap member, the head of the rivet projecting into the path of one of the lugs 76 to serve as a limit stop therefor. A resilient compression washer 81 of rubber or the like is interposed between a steel washer 82 on the hand 74 and the outer end of the cap member 12 to insure a tight connection between the hand and wrist. Alternatively, the threaded shank 73 might be screwed directly into a threaded hole in the end of the cap member 12.

In the operation of the device, rotation of the stump socket 15 causes the pinion carrier 13 to rotate with it, driving the sun gear 35 at an increased ratio of rotation. During the initial movement of the sun gear and clutch release member 40, the overhanging lips 60 of the two advancing ledges 50, 50' engage their respective rollers to dislodge the same from their locking position, whereupon the ledges engage the sides of the platform 52 to turn the cap member 12 with the sun gear. When the torsional force applied by the stump is released, or if the torque load on the cap member is suddenly reversed so that the cap member tends to over-run or drive the stump socket, the spring 54 urges the dislodged roller 53 back into locking position, and the cap member 12 is then locked against turning in either direction by torsional loads applied at the hand end thereof.

While we have shown and described in some detail what we consider to be the preferred embodiment of our invention, it is to be understood that such details are not to be taken as restrictive, but that various changes may be made in the shape and arrangement of the several parts without departing from the broad scope of the invention as defined in the appended claims.

We claim:

1. A prosthetic wrist for use in partial amputation of the forearm, comprising a first member adapted for connection to the upper arm of the user and held thereby against turning, a second member rotatable with respect to said first member and adapted for connection to the forearm stump to be turned thereby, a third member rotatably supported on said first member and adapted for connection with a prosthetic hand, and planetary gear means connecting said second member with said third member about a common axis for driving the latter at a stepped-up gear ratio, said gear means including a ring gear, planet gear carrier, and a sun gear connected to said first, second, and third members, respectively.

2. A prosthetic wrist for use in partial amputation of the forearm, comprising a first member adapted for connection to the upper arm of the user and held thereby against turning, a second member rotatable with respect to said first member and adapted for connection to the forearm stump to be turned thereby, a third member adapted for connection with a prosthetic hand, means for supporting said third member for rotary movement relative to said first member about an axis disposed longitudinally of the second member and the stump, rotary motion transmitting means for transmitting rotary motion between said second member and said third member, an input for the latter means responsive to rotary motion of said second member, an output for said rotary motion transmitting means for imparting rotary motion to said third member, releasable locking means between said input and said output for holding said rotary motion transmitting means from rotation, and means responsive to torsional loads on said third member for rendering said locking means effective.

3. A prosthetic wrist for use in partial amputation of the forearm, comprising a first member adapted for connection to the uper arm of the user and held thereby against turning, a second member rotatable with respect to said first member and adapted for connection to the forearm stump to be turned thereby, a third member adapted for connection with a prosthetic hand, means for supporting said third member for rotary movement relative to said first member about an axis disposed longitudinally of the second member and the stump, rotary motion transmitting means for transmitting rotary motion between said second member and said third member, an input for the latter means responsive to rotary motion of said second member, an output for said rotary motion transmitting means for imparting rotary motion to said third member, releasable locking means between said input and said output and cooperating with said first member and said third member for holding the latter from rotation, and means responsive to torsional loads on said third member for rendering said locking means effective.

4. A prosthetic wrist for use in partial amputation of the forearm, comprising a first member adapted for connection to the upper arm of the user and held thereby against turning, a second member rotatable with respect to said first member and adapted for connection to the forearm stump to be turned thereby, a third member adapted for connection with a prosthetic hand, means for supporting said third member for rotary movement relative to said first member about an axis disposed longitudinally of said second member and the stump, rotary motion transmitting means disposed between said second member and said third member for transmitting rotary motion at an increased speed ratio, an input for the latter means responsive to rotary motion of said second member, an output for said rotary motion transmitting means for imparting rotary motion to said third member at an increased speed ratio, releasable locking means between said input and said output for holding said rotary motion transmitting means from rotation, and means responsive to torsional loads on said third member for rendering said locking means effective.

5. A prosthetic wrist for use in partial amputation of the forearm, comprising a first member adapted for connection to the upper arm of the user and held thereby against turning, a second member rotatable with respect to said first member and adapted for connection to the forearm stump to be turned thereby, a third member rotatably supported on said first member and adapted for connection with a prosthetic hand, means connecting said second member with said third member for imparting rotary movement to the latter, and means for locking said third member against turning under loads applied from the hand end thereof, said locking means including a pair of rollers disposed between a concave cylindrical surface on said first member and a flat plane surface on said third member, spring means urging said rollers apart and into the converging ends of the space between said members, and means connected with said second member and operative during the initial movement thereof to dislodge one of said rollers from its locking position to permit rotation of said third member in one direction by said second member.

6. A prosthetic wrist for use in partial amputation of the forearm, comprising a first member adapted for connection to the upper arm of the user and held thereby against turning, a second member rotatable with respect to said first member and adapted for connection to the forearm stump to be turned thereby, a third member rotatably supported on said first member and adapted for connection with a prosthetic hand, means connecting said second member with said third member about a common axis for imparting rotary movement to the latter, means for locking said third member against turning under loads applied from the outer end thereof, and means responsive to the initial movement of said second member for releasing said locking means to permit rotation of said third member by said second member.

7. A prosthetic wrist for use in partial amputations of the forearm, comprising a forearm shell adapted for connection to the upper arm of the user and held thereby against turning, a housing fixed to said forearm shell, a stump socket adapted for connection to the forearm stump to be turned thereby, a pinion carrier journaled on said housing and connected to said stump socket, a cap member journaled on said housing and adapted to receive a prosthetic hand, a ring gear fixed to said housing, a sun gear operatively connected with said cap member to drive the same, and a plurality of planet pinions journaled on said pinion carrier and meshing with both said sun gear and said ring gear whereby said cap member is driven by said stump socket at a stepped-up gear ratio.

8. A prosthetic wrist for use in partial amputations of the forearm, comprising a forearm shell adapted for connection to the upper arm of the user and held thereby against turning, a housing fixed to said forearm shell, a stump socket adapted for connection to the forearm stump to be turned thereby, a pinion carrier journaled on said housing and connected to said stump socket, a cap member journaled on said housing and adapted to receive a prosthetic hand, a ring gear fixed to said housing, an annular member mounted on said cap member for a limited amount of lost motion rotation with respect thereto, a sun gear fixedly mounted on said annular member, a plurality of planet pinions journaled on said pinion carrier and meshing with both said ring gear and said sun gear whereby the latter is driven by said stump socket at a stepped-up gear ratio, a plurality of pairs of locking rollers disposed between a concave cylindrical surface on said housing and flat plane top surfaces of platform portions provided on said cap member, spring means urging the rollers of said pairs apart and into the converging ends of the spaces between said surfaces, and ledge portions on said annular member having projecting lips engageable with one of the rollers of each pair to dislodge the same from its locking position during initial lost motion of said annular member relative to said cap member to permit rotation of the cap member in one direction, said ledge portions thereafter engaging the sides of said platform portions to turn said cap member with said sun gear.

9. A prosthetic wrist for use in partial amputation of the forearm, comprising a first member adapted for connection to the upper arm of the user and held thereby against turning, a second member rotatable with respect to said first member and adapted for connection to the forearm stump to be turned thereby, a third member adapted for connection with a prosthetic hand, means for supporting said third member for rotary movement relative to said first member about an axis disposed longitudinally of said second member and the stump, rotary motion transmitting means operable independently of the length of the stump for transmitting rotary motion at an arbitrarily selected increased speed ratio between said second member and said third member, an input for said rotary motion transmitting means responsive to rotary motion of said second member, and an output for said rotary motion transmitting means for imparting rotary motion to said third member at said increased speed ratio, said rotary motion transmitting means and said input and said output therefor being disposed along said axis and within the longitudinal space between said second member and said third member.

10. A prosthetic wrist for use in partial amputation of the forearm, comprising a first member adapted for connection to the upper arm of the user and held thereby against turning, a second member rotatable with respect to said first member and adapted for connection to the forearm stump to be turned thereby, a third member adapted for connection with a prosthetic hand, means for supporting said third member for rotary movement relative to said first member about an axis disposed longitudinally of the second member and the stump, rotary motion transmitting means for transmitting rotary motion at an increased speed ratio, an input for imparting rotary motion to the latter means, an output for delivering rotary motion from said rotary motion transmitting means at an increased speed ratio, means for causing said input to respond to rotary motion of said second member, and means for causing said third member to respond to rotary motion of said output, said rotary motion transmitting means and said input and said output therefor being disposed along said axis and within the longitudinal space between said second member and said third member.

JOHN K. NORTHROP.
MICHAEL J. NAGY.

REFERENCES CITED

The following references are of record in the file of this patent:

UNITED STATES PATENTS

| Number | Name | Date |
|---|---|---|
| 999,484 | Carnes | Aug. 1, 1911 |
| 1,305,169 | Rohrman | May 27, 1919 |
| 1,499,052 | Carson | June 24, 1924 |
| 2,408,880 | Rebers | Oct. 8, 1946 |

FOREIGN PATENTS

| Number | Country | Date |
|---|---|---|
| 518,443 | France | Jan. 3, 1921 |
| 527,442 | France | Oct. 25, 1921 |
| 311,921 | Germany | May 5, 1919 |
| 397,703 | Germany | June 27, 1924 |